United States Patent [19]

Hagihara et al.

[11] 3,862,021
[45] Jan. 21, 1975

[54] POLYMERIZABLE COMPOSITIONS AND LAMINATED ARTICLES BONDED

[75] Inventors: Takaeki Hagihara, Asaka; Haruo Sato, Niiza; Shozo Sasaki, Tokyo, all of Japan

[73] Assignee: Asahi Kasei Kogyo Kabushiki Kaisha, Osaka, Japan

[22] Filed: Feb. 12, 1973

[21] Appl. No.: 331,414

[30] Foreign Application Priority Data
Feb. 17, 1972 Japan.............................. 47-15966
Feb. 17, 1972 Japan.............................. 47-15967

[52] U.S. Cl.......... 204/159.15, 117/93.31, 161/203, 204/159.16, 260/31.4, 260/31.6, 260/835, 260/859 R
[51] Int. Cl............................................... B01j 1/10
[58] Field of Search............ 204/159.15; 260/859 R

[56] References Cited
UNITED STATES PATENTS

| | | | |
|---|---|---|---|
| 3,008,917 | 11/1961 | Park et al........................ | 260/859 R |
| 3,509,234 | 4/1970 | Burlant et al. .................. | 260/859 R |
| 3,677,920 | 7/1972 | Kai et al. ........................ | 204/159.15 |

*Primary Examiner*—Murray Tillman
*Assistant Examiner*—Thurman Ennis Page
*Attorney, Agent, or Firm*—Burgess, Dinklage & Sprung

[57] ABSTRACT

A polymerizable composition comprising:

I. about 100 parts by weight of an unsaturated polyurethane produced from a diisocyanate and an unsaturated esterdiol having an acid value of up to about 10, a number average molecular weight of from about 500 to 2,500 and containing about $1.2 \times 10^{-4}$ to $3.8 \times 10^{-4}$ mole of ethylenic double bond concentration per gram of said unsaturated esterdiol, said unsaturated esterdiol having been prepared by reaction between an alcoholic component comprising at least one stereo-hindered diol having a molecular weight of from about 90 to 400 and an acidic component comprising at least one unsaturated dicarboxylic acid, its anhydride or its methyl or ethyl ester and at least one saturated dicarboxylic acid, its anhydride or its methyl or ethyl ester.

II. about 100 to 350 parts by weight of at least two ethylenically unsaturated monomers
A. one of said monomers comprising a compound selected from the group consisting of:

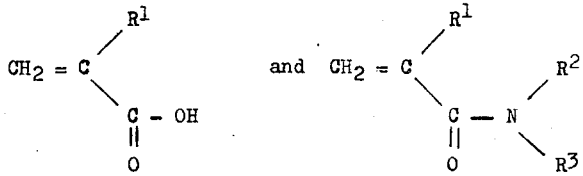

wherein $R^1$ and $R^2$ represent a hydrogen atom or methyl group respectively, and $R^3$ represents a hydrogen atom, alkyl group having 1 to 3 carbon atoms, hydroxymethyl or benzyl group, B. the other of said monomers being present to the extent of from about 70 to 95 % by weight of the monomers and comprising at least one compound selected from group consisting of:

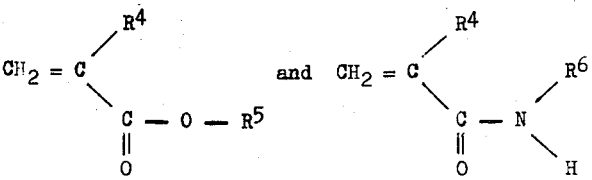

wherein $R^4$ represents a hydrogen atom or methyl group; $R^5$ represents an alkyl group having 1 to 8 carbon atoms, 3-chloro-2-hydroxypropyl, glycidyl, tetrahydrofurfuryl or oxyalkylene group of

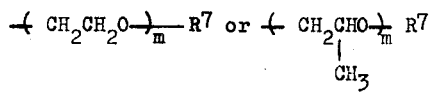

having a number average molecular weight of from about 45 to about 1,000, wherein $R^7$ represents a hydrogen atom or methyl group; and $R^6$ represents a butoxymethyl group or 3-oxohydrocarbon group having 4 to 8 carbon atoms; and III. about 0.01 to 10 parts by weight of a polymerization initiator.

The polymerizable compositions are especially effective for producing a variety of laminated articles.

27 Claims, No Drawings

POLYMERIZABLE COMPOSITIONS AND LAMINATED ARTICLES BONDED

BACKGROUND OF THE INVENTION

This invention relates to novel polymerizable compositions which are polymerizable by the action of actinic light or heat and which are particularly useful in the production of laminated articles such as laminated safety glass and other multilayer articles.

Laminated articles according to the present invention comprise at least two adherents and at least one interlayer layer between each adjacent pair of adherents.

With laminated articles having a large area composed of adherents having a different thermal expansibility, e.g., glass and a plastic or a metal; the interlayers of laminated articles are preferred to absorb an expansion or contraction caused by a temperature difference of environments and is required to have a high mechanical strength, softness and elongation as well as an adhesion. On the other hand laminated safety glass having the same adherents of a low thermal expansibility is not influenced by thermal warping and distortion to as great an extent, but is required to have a high absorbability of impact by way of precaution against collision accidents. Accordingly, it is necessary that the interlayers have a high mechanical strength, softness and elongation as well as an adhesion as in the case of other laminated articles.

For example, U.S. Pat. No. 3,677,920 describes that a photopolymerizable composition comprising a diisocyanate modified unsaturated polyester at least two ethylenically unsaturated monomers and a photopolymerizable initiator is especially effective for producing a variety of laminated articles. A safety glass obtained by using this photopolymerizable composition as interlayer withstands the severest penetration resistance test according to American Standards Association Z26-1-1966. However, the penetration resistance of the safety glass is still unsatisfactory.

THE INVENTION

In accordance with this invention, there is provided a polymerizable composition comprising:

I. about 100 parts by weight of an unsaturated polyurethane produced from a diisocyanate and an unsaturated esterdiol having an acid value of up to about 10, a number average molecular weight of from about 500 to 2,500 and containing about $1.2 \times 10^{-4}$ to $3.8 \times 10^{-4}$ mole of ethylenic double bond concentration per gram of said unsaturated esterdiol, said unsaturated esterdiol having been prepared by reaction between an alcoholic component comprising at least one stereo-hindered diol having a molecular weight of from about 90 to 400 and an acidic component comprising at least one unsaturated dicarboxylic acid, its anhydride or its methyl or ethyl ester and at least one saturated dicarboxylic acid, its anhydride or its methyl or ethyl ester, II. about 100 to 350 parts by weight of at least two ethylenically unsaturated monomers A. one of said monomers comprising a compound selected from the group consisting of:

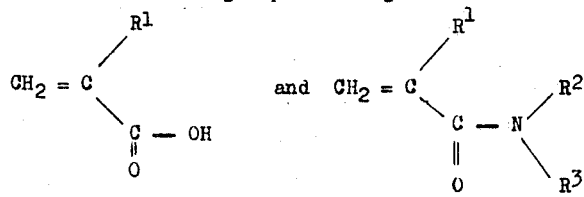

wherein $R^1$ and $R^2$ represent a hydrogen atom or methyl group respectively, and $R^3$ represents a hydrogen atom, alkyl group having 1 to 3 carbon atoms, hydroxymethyl or benzyl group, B. the other of said monomers being present to the extent of from about 70 to 95 % by weight of the monomers and comprising at least one compound selected from group consisting of:

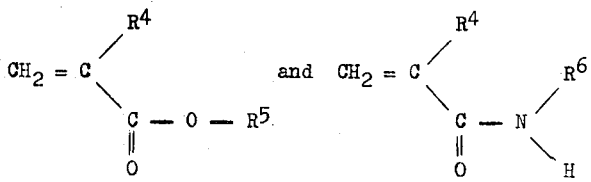

wherein $R^4$ represents a hydrogen atom or methyl group; $R^5$ represents an alkyl group having 1 to 8 carbon atoms, 3-chloro-2-hydroxypropyl, glycidyl, tetrahydrofurfuryl or oxalkylene group of

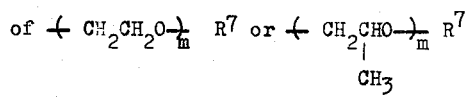

having a number average molecular weight of from about 45 to about 1,000, wherein $R^7$ represents a hydrogen atom or methyl group; and $R^6$ represents a butoxymethyl group or 3-oxohydrocarbon group hving 4 to 8 carbon atoms; and III. about 0.01 to 10 parts by weight of a polymerization initiator.

The polymerized products obtained from the polymerizable compositions of the present invention exhibit an excellent softness and a high tensile strength, elongation and elasticity against mechanical impact. The laminated safety glass derived from the polymerizable composition as interlayer has a very high absorbability of impact and shows an excellent penetration resistance. The polymerized interlayers derived from the polymerizable composition of this invention bonded to at least two different adherents completely absorb a thermal warping and distortion of the adherents and may be bonded to the adherents so as to glide between the adherents even if a rapid temperature change occurs at the time of thermal impact.

The stereo-hindered diols which are used in the preparation of the unsaturated esterdiols have a molecular weight of from about 90 to 400. With the stereohindered diols having a molecular weight of less than about 90 or with ordinary diols having a small stereohindrance, an interlayer of laminated articles derived from the polymerizable composition comprising an unsaturated polyurethane which is produced from a diisocyanate and the unsaturated esterdiols becomes so low in softness and does not exhibit so high an elongation and elasticity that the laminated articles show a low penetration resistance and absorbability of thermal warping and distortion. When diols having a low molecular weight and a small stereohindrance such as ethyleneglycol are used, the unsaturated polyurethanes derived therefrom cease to mix well with the ethylenically unsaturated monomers. On the other hand when the molecular weight of the stereohindered diols is more than about 400, an interlayer of laminated articles becomes so soft and does not exhibit a high tensile strength.

The unsaturated esterdiols which are used in the preparation of the unsaturated polyurethanes have a number average molecular weight of from about 500 to 2,500. When the number average molecular weight of the unsaturated esterdiols is below about 500, an interlayer of laminated articles becomes so hard that the laminated articles exhibit an extremely low penetration resistance and absorbability of thermal warping and distortion. On the other hand when the number average molecular weight of the unsaturated esterdiols is above about 2,500, the properties of the laminated articles are not so practically improved.

The term "ethylenic double bond concentration" in the unsaturated esterdiol means the mole number of ethylenic double bond per 1 gram of the unsaturated esterdiol. The ethylenic double bond concentration in the unsaturated esterdiols is in the range of from about $1.2 \times 10^{-4}$ to $3.8 \times 10^{-4}$ mole per gram. With ethylenic double bond concentration above about $3.8 \times 10^{-4}$ mole per gram, an interposed layer of laminated articles tends to become so hard and so low in elasticity and elongation that the laminated articles exhibit a remarkably low penetration resistance. On the other hand when the ethylenic double bond concentration is below about $1.2 \times 10^{-4}$ mole per gram, the polymerizable compositions do not give sufficiently crosslinked, net-work polymers after polymerization and the elongation and elasticity of such interlayer extremely increase while the tensile strength remarkably decreases and the transparency of such laminated article is also reduced.

Examples of suitable stereo-hindered diols include alkyldiols such as 1,1-dimethyl-1,2-ethanediol, 1,2-dimethyl-1,2-ethanediol, 1,1,2,2tetramethyl-1,2-ethanediol, 1-ethyl-1,2-ethanediol, 1-ethyl-2-methyl-1,2-ethanediol, 1-methyl-1,3-propanediol, 1-ethyl-1,3-propanediol, 2,2-dimethyl-1,3-propanediol, 2-methyl-2-ethyl-1,3-propanediol, 1,1,3-trimethyl-1,3-propanediol, 2,2-dimethyl-3-isopropyl-1,3-propanediol, 2-ethyl-3-propyl-1,3-propanediol, 1-methyl-1,4-butanediol, 2-ethyl-1,4-butanediol, 2,2-dimethyl-1,4-butanediol, 2-methyl-1,5-pentanediol, 2-methyl-2-propyl-1,5-pentanediol, 2-ethyl-1,6-hexanediol and 2,2,4-trimethyl-1,6-hexanediol; cycloalkyldiols such as 1,2-cyclobutanediol, 1,3-cyclobutanediol, 1,3-cyclohexanediol, 1,4-cyclohexanediol, 1,3-dimethylol cyclohexane, 1,4-dimethylol cyclohexane, 4,4'-dicyclohexydiol, 4,4'-dicyclohexydiol and 4,4'-isopropylidene dicyclohexyldiol, and phthalates having number molecular weight of from about 90 to 400 such as bis (beta-hydroxypropyl) terephthalate, bis (beta-hydroxypropyl) isophthalate, bis (beta-hydroxypropyl) phthalate, bis (beta-hydroxyneopentyl) terephthalate, bis (beta-hydroxyneopentyl) isophthalate, bis (beta-hydroxyneopentyl) phthalate, bis (beta-hydroxyethyl) isophthalate and bis (beta-hydroxyethyl) phthalate. Among these stereo-hindered diols branched alkyldiols are more preferred.

Up to about 60 % by weight of the stereo-hindered diol may be substituted with ordinary diols including, for example, ethyleneglycol, alkyleneglycols of the formula, $HO-(CH_2)_n-OH$, wherein n is an integer of 3 to 10, 1,2-propanediol, polyoxyethyleneglycols having a number average molecular weight of from about 100 to 1,500, polyoxypropyleneglycols having a number average molecular weight of from about 100 to 1,500, polyoxytetramethyleneblycols having a number average molecular weight of from about 100 to 1,500 and polycaprolactonediols having a number average molecular weight of from about 500 to 1,500.

Exemplary unsaturated dicarboxylic acids, anhydrides and methyl or ethyl esters thereof utilized for the preparation of an unsaturated esterdiol include maleic acid, fumaric acid, citraconic acid, mesaconic acid, itaconic acid, glutaconic acid, muconic acid, aconitic acid, dimethyl or diethyl esters thereof or anhydrides thereof, especially maleic anhydride, citraconic anhydride and itaconic anhydride.

Examples of suitable saturated dicarboxylic acids, anhydrides and methyl or ethyl esters thereof utilized for adjusting or controlling the ethylenic double bond concentration of unsaturated esterdiols include oxalic acid, malonic acid, succinic acid, glutaric acid, adipic acid, pimelic acid, suberic acid, azelaic acid, sebacic acid, phthalic acid, isophthalic acid, terephthalic acid, biphenyl dicarboxylic acid, bis (p-carboxyphenyl) methane, 2,2-bis (p-carboxyphenyl) butane, 1,5-nephthalene dicarboxylic acid, dimethyl or diethyl esters thereof, and phthalic anhydride.

The unsaturated esterdiols may be prepared by conventional processes. Usually an unsaturated esterdiol is formed by direct esterification, ester exchange or addition reaction between a stereo-hindered diol, an unsaturated dicarboxylic acid and a saturated dicarboxylic acid with, if desired, an ordinary diol in a mole ratio of $2 > OH/COOH > 1$ at a temperature of from about 150°C. to 250°C. under reduced pressure in a nitrogen atmosphere.

Exemplary organic diisocyanates to be reacted with the unsaturated esterdiols include 2,4-tolylene diisocyanate, 2,6-tolylene diisocyanate, m-phenylene diisocyanate, p-phenylene diisocyanate, 1,3-dimethylphenyl-2,4-diisocyanate, 1-chlorophenyl-2,4-diisocyanate, 4,4'-diphenyl diisocyanate, 2,2'-diethyl-4,4'-diphenyl diisocyanate, 4,4'-diphenylmethane diisocyanate, 3,3'-dimethoxy-4,4'-diphenylmethane diisocyanate, 3,3'-dimethyl-4,4'-diphenylmethane diisocyanate, 1,4-naphthylene diisocyanate, 1,5-naphthylene diisocyanate, p-xylylene diisocyanate, m-xylylene diisocyanate, 1,4-tetramethylene diisocyanate, 1,6-hexamethylene diisocyanate, 1,10-decamethylene diisocyanate, 2,2,4-trimethyl-1,6-hexamethylene diisocyanate, $\omega,\omega'$-octadecyl diisocyanate, $\omega,\omega'$-dipropylether diisocyanate, 1,4-cyclohexyl diisocyanate, 1,3-cyclohexyl diisocyanate, 4,4'-dicyclohexylmethane diisocyanate, 1,5-tetrahydronaphthylene diisocyanate, 1,5-decahydronaphthylene diisocyanate, 2,6-methylcaproate diisocyanate and isophorone diisocyanate.

The unsaturated polyurethanes may be prepared by effecting reaction between the unsaturated esterdiol and the diisocyanate in a mole ratio of from 1:0.7 to 1:1.1, preferably from 1:0.90 to 1:1.05 at a temperature of from about 60°C. to 150°C. in a nitrogen atmosphere in the presence or absence of a catalyst. The catalysts include, for example, tertiary amines such as diethylcyclo-hexylamine and triethylamine, and organo-heavy metal compounds soluble in the reaction system such as ferrous acetoacetate, dibutyltin dilaurate, stannous oleate, stannous octate and antimony trichloride.

The ethylenically unsaturated monomers (A) act as component to impart mechanical strength to the polymerized interlayers of laminated articles. These compounds have a high rate of polymerization and shorten the time required for curing. These compounds have a strong molecular cohesion and produce polymerized interlayers having an increased mechanical strength and also increase adhesion of interlayers, to adherents due to high polarity.

The amount of these compounds (A) is preferably about 5 to 30 % by weight of the total ethylenically unsaturated monomers. When the amount is less than about 5 % by weight, such remarkably reduces the mechanical strength and adhesion of the polymer after polymerization. On the other hand when the amount is more than about 30 %, the softness and elongation of the polymer after polymerization is lost.

The ethylenically unsaturated monomers (B) act as component to impart softness and elongation to the polymerized interlayers of laminated articles. These compounds have a high rate of polymerization and shorten the time required for curing and produce polymers having an increased softness elongation. The laminated articles obtained therewith have an excellent absorbability of both mechanical and thermal impacts.

The amount of these compounds (B) is preferably about 70 to 95 % by weight of the total ethylenically unsaturated monomers. When the amount is less than about 70 % by weight, such decreases the softness and elongation of the polymer after polymerization and remarkably reduces the absorbability of thermal warping and distortion and impact of the laminated articles obtained therewith. On the other hand when the amount is more than about 95 % by weight, the mechanical strength of the polymer after polymerization is lost.

The two ethylenically unsaturated monomers (A) and (B) are employed in an amount of from about 100 to 350 parts by weight, based on 100 parts of the unsaturated polyurethane.

Examples of suitable compounds (A) include acrylic acid, methacrylic acid, acrylamide, methacrylamide, N,N-dimethyl-acrylamide, N,N-dimethylmethacrylamide, N-isopropylacrylamide, N-isopropylmethacrylamide, N-methylolacrylamide, N-methylolmethacrylamide, N-benzylacrylamide and N-benzylmethacrylamide.

Examples of suitable compounds (B) include methyl acrylate, ethyl acrylate, n-butyl acrylate, isopropyl acrylate, n-pentyl acrylate, n-octyl acrylate, 2-ethylhexyl acrylate, 2-hydroxyethyl acrylate, 2-hydroxypropyl acrylate, dioxyethyleneglycol monoacrylate, dioxypropyleneglycol monoacrylate, tetraoxyethyleneglycol monoacrylate, monoacrylates of polyoxyethyleneglycols having a number average molecular weight of from about 200 to 1,000, monoacrylates of polyoxypropyleneglycols having a number average molecular weight of from about 300 to 1,000, acrylates of ω-methoxypolyoxyethyleneglycol having a number average molecular weight of about 400, 3-chloro-2-hydroxypropyl acrylate, glycidyl acrylate, tetrahydrofurfuryl acrylate, N-butoxymethyl acrylate, methyl methacrylate, ethyl methacrylate, n-butyl methacrylate, isopropyl methacrylate, n-pentyl methacrylate, n-octyl methacrylate, 2-ethylhexyl methacrylate, 2-hydroxyethyl methacrylate, 2-hydroxypropyl methacrylate, dioxyethyleneglycol monomethacrylate, dioxypropyleneglycol monomethacrylate, tetraoxyethyleneglycol monomethacrylate, monomethacrylates of polyoxyethylene glycols having a number average molecular weight of from about 200 to 1,000, methacrylates of ω-methoxypolyoxyethylene glycol having a number average molecular weight of about 400, monomethacrylates of polyoxypropyleneglycols having a number average molecular weight of from about 300 to 1,000, 3-chloro-2-hydroxypropyl methacrylate, glycidyl methacrylate, tetrahydrofurfuryl methacrylate, n-butoxymethyl methacrylate, N-n-butoxymethyl acrylamide, N-isobutoxymethyl acrylamide, N-3-oxobutyl acrylamide, N-3-oxo-1-methyl-butyl acrylamide, N-3-oxo-1-methyl-1,3-diethylpropyl acrylamide, N-3-oxo-1,1-dimethyl-butyl acrylamide, N-3-oxo-1,1-dimethyl-pentyl acrylamide, N-n-butoxymethyl methacrylamide, N-ixobutoxymethyl methacrylamide, N-3-oxo-butyl methacrylamide, N-3-oxo-1-methyl-butyl methacrylamide, N-3-oxo-1-methyl-1,3-diethyl-propyl methacrylamide, N-3-oxo-1,1-dimethyl-butyl methacrylamide and N-3-oxo-1,1-dimethyl-pentyl methacrylamide.

In order to adjust the refractive index and to improve the transparency of the polymerized interlayers of articles, (C) aromatic compounds having at least one

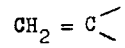

group and one benzene nucleus may be incorporated into the polymerizable compositions of this invention. Further, in order to improve the adhesion of the polymerized interlayers or articles to adherents, (D) other ethylenically unsaturated compounds may also be incorporated into the polymerizable composition of the present invention.

Examples of suitable compounds (C) include styrene, chlorostyrene, vinyltoluene, alpha-methylstyrene, alpha-chlorostyrene, aminostyrene, methoxystyrene, vinylphenol, vinylbenzoic acid, allylbenzene, allyltoluene and monoallylphthalate.

Examples of suitable other ethylenically unsaturated compounds (D) include allyl alcohol, allylacetate, vinylacetate, vinylpropionate, alpha-vinylacetic acid, maleic acid, fumaric acid, dimethyl maleate, dimethyl fumarate, diethyl maleate, dimethyl itaconate, cinnamic acid, maleic anhydride, ethylvinyl ether, propylvinyl ether, methylvinyl ether, methylvinyl ketone, vinylpyridine, vinylpyrrolidone, vinylcarbazole, acrylonitrile, N-3-oxo-1,1-dimethyl-4-hydroxybutyl acrylamide and N-3-oxo-1,1-dimethyl-4-hydroxybutyl methacrylamide.

These compounds (C) and/or (D) may be employed in an amount of up to 40 % of the total weight of the two ethylenically unsaturated monomers (A) and (B).

In order to improve the impact resistance at higher temperatures of the polymerized interlayers or articles, it is preferred that the polymerizable composition of this invention additionally contains at least one polyfunctional unsaturated compound having an ethylenic double bond concentration of from about $6.6 \times 10^{-3}$ to $3.3 \times 10^{-2}$ mole per gram.

Examples of suitable compounds include compounds of the formula

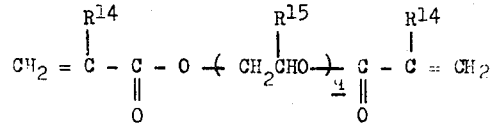

wherein $R^{14}$ and $R^{15}$ represent a hydrogen atom or methyl group respectively, and $q$ is an integer of 1 to 3, neopentyl diacrylate, neopentylglycol dimethacrylate, butyleneglycol diacrylate, butyleneglycol dimethacrylate, trimethylolethane diacrylate, trimethylolethane dimethacrylate, trimethylolpropane diacrylate, trimethylolpropane dimethacrylate, trimethylolpropane triacrylate, trimethylolpropane trimethacrylate, tetramethylolpropane triacrylate, tetramethylolpropane trimethacrylate, tetramethylolmethane tetraacrylate, tetramethylolmethane tetramethacrylate, allylacrylate, allylmethacrylate, methylenebisacrylamide, ethylenebisacrylamide, diallylcyamide, tetraallyloxyethane, diallylphthalate, trimethylolpropanediallylether, tetra-N-allylmelamine and divinylbenzene.

These compounds are employed in an amount of from about 0.1 to 7.0 % of the total weight of the polymerizable composition comprising the components (I) (II) and (III). When the amount is less than about 0.1 %, such does not significantly change the impact resistance at higher temperatures of the polymerized article after polymerization. On the other hand, amounts of compounds of more than 7.0 % remarkably decrease the impact resistance at 20°C. although the impact resistance at higher temperatures is improved.

Furthermore, in order to improve the impact resistance, especially at lower temperatures of the polymerized interlayers or articles, it is preferred that the polymerizable compositions additionally contain, as plasticizer, about 5 sto 50 % by weight, based on the total weight of the polymerizable composition, of at least one compound selected from the group consisting of:

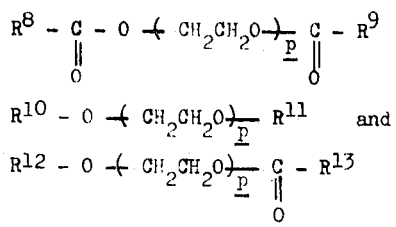

wherein $R^8$, $R^9$ and $R^{13}$ represent a n-alkyl group having 1 to 5 carbon atoms or phenyl group respectively; $R^{10}$, $R^{11}$ and $R^{12}$ represent a hydrogen atom, n-alkyl group having 1 to 5 carbon atoms or phenyl group respectively; and $p$ is an integer of 1 to 10.

When $p$ is more than 10 in the above-described formulae or when $R^8$, $R^9$, $R^{10}$, $R^{11}$, $R^{12}$ and $R^{13}$ represent an alkyl group having more than 5 carbon atoms in the above-described formulae, the compatibility of the compounds with the other components of the polymerizable composition becomes poor and the transparency of the laminated safety glass obtained therefrom is lost and the improvement in the penetration resistance of the laminated safety glass according to American Standards Association Z26-1-1966 is not observed. Also when $R^8$, $R^9$, $R^{10}$, $R^{11}$, $R^{12}$ and $R^{13}$ represents a branched alkyl group in the above-described formulae, the transparency of the laminated safety glass is lost due to the same reason as mentioned above and the penetration resistance of the laminated safety glass at lower temperatures and higher temperatures is not improved although the penetration resistance at 20°C. is improved.

When the compounds are employed it is preferred that (A) one of the two ethylenically unsaturated monomers is present to the extent of from about 20 to 70 % by weight of the monomers and (B) the other of said monomers is present to the extent of from about 30 to 80 % by weight of the monomers.

Example of suitable compounds include ethyleneglycol, dioxyethyleneglycol, trioxyethyleneglycol, tetraoxyethyleneglycol, polyoxyethyleneglycol having a number average molecular weight of from about 100 to 400, ethyleneglycol monomethyl ether, ethyleneglycol monoethyl ether, ethyleneglycol mono-n-butyl ether, ethyleneglycol monoacetate, ethyleneglycol monoethyl ether acetate, dioxyethyleneglycol monoethyl ether dioxyethyleneglycol diethyl ether, trioxyethyleneglycol dimethyl ether, ethyleneglycol diacetate ethyleneglycol di-n-propionate, triethyleneglycol divalerate, triethyleneglycol valerate caproate, tetraethyleneglycol di-n-butyrate, ethyleneglycol dicaproate, diethyleneglycol dicaproate, triethyleneglycol dicaproate, dicaproates of polyethyleneglycols having a number average molecular weight of from about 100 to 400, ethyleneglycol dibenzoate, diethyleneglycol dibenzoate, triethyleneglycol dibenzoate, dibenzoates of polyethyleneglycols having a number average molecular weight of from about 100 to 400, ethyleneglycol diphenylether, diethyleneglycol diphenylether, triethyleneglycol diphenylether and diphenylethers of polyethyleneglycols having a number average molecular weight of from about 100 to 400.

The unsaturated polyurethanes according to the present invention can be polymerized with the aforesaid ethylenically unsaturated monomers and compounds with the use of a known polymerization initiator. The polymerization initiators may be known photopolymerization initiators or thermal polymerization initiators.

Examples of suitable such photopolymerization initiators include benzoins such as benzoin, benzoin methyl ether, benzoin ethyl ether benzoin isopropyl ether, alpha-methylbenzoin, alpha-ethylbenzoin, alpha-methylbenzoin methyl ether, alpha-phenylbenzoin, alpha-allylbenzoin; phenones such as acetophenone, alpha-chloroacetophenone, alpha-bromoacetophenone, benzophenone; anthraquinones such as anthraquinone, 1-chloroanthraquinone, 2-ethylanthraquinone, 2-tert-butylanthraquinone, disulphides such as diphenyl disulphide, tetraethylthiuram disulphide; diketones such as benzil, diacetyl; and metal halides such as stanic chloride, stannous chloride and titanium chloride.

Examples of suitable thermal polymerization initiators include organoperoxides such as 1-methylcyclohexyl hydroperoxide, cumen hydroperoxide, di-tert-butyl peroxide, dicumyl peroxide, anthrathene peroxide, diisopropyl peroxide, methylethylketone peroxide, benzoyl peroxide, lauroyl peroxide, p,p'-dimethylbenzoyl peroxide, p,p'-dichlorobenzoyl peroxide, p,p'-dimethoxybenzoyl peroxide; inorganoperoxides such as potassium persulfate, ammonium persulfate; and azo compounds such as diazoaminobenzene, 2,2'-azobisisabutyronitrile and 2,2'-azobis-2-methylbutyronitrile. These thermal polymerization initiators may be used together with a known accelerator such as cobalt naphthenate.

These polymerization initiators are used in an amount of from about 0.01 to 10 parts by weight based upon 100 parts by weight of the unsaturated polyurethane.

When a photopolymerization initiator is used the photopolymerizable compositions are photopolymerized by actinic radiation having wave lengths below 7,000 angstroms, generally between 2,000 and 5,000 angstroms. Practical sources of such actinic radiation include carbon arc lamps, super high pressure mercury lamps, high pressure mercury lamps, low pressure mercury lamps, UV fluorescent lamps, xenon lamps and sunlight.

When the photopolymerization initiators are employed, known thermal polymerization inhibitors may be employed for the purpose of maintaining storage stability (shelf life) of the polymerizable compositions.

Exemplary thermal polymerization inhibitors include hydroquinone, mono-tert-butyl hydroquinone, 2,5-di-tert-butyl hydroquinone, catechol, tert-butyl catechol, benzoquinone, 2,5-diphenyl-p-benzoquinone, pyridine, phenothiazine, p-diaminobenzene, beta-naphthol, naphthylamine, pyrogallol, p-methoxy phenol, nitrobenzene, triphenyl phosphite and cuprous chloride.

The amount of the inhibitors may be preferably about 0.005 to 3.0 % by weight of the total weight of the polymerizable composition.

Furthermore, fillers may be incorporated into the polymerizable compositions. Such fillers include, for example, polyvinylbutyrals, polystyrenes, polymethylmethacrylates, polyvinylchlorides, poly(styrenebutadiene) polymers, polybutadienes, soluble polyamides, polyurethanes, polyepichlorhydrines, polypropyleneoxides and ethylene copolymers such as ethylene-vinylacetate copolymers and ethylene-acrylic acid copolymers and cellulose esters.

Examples of suitable adherents for the polymerizable compositions of this invention include plastic adherents such as polyamides, polyvinylchlorides, polymethylmethacrylates, polystyrenes, polyethylene terephthalates, polycarbonates, polyurethanes, ethylene-vinylacetate copolymers, ethyleneacrylic acid copolymers, polypropylenes, cellophanes, cellulose acetates or celluloides; metals or alloys such as aluminum, tin, zinc, steel, stainless steel or duralumin; ceramics such as glass such as ordinary glass, thermal tempered glass and chemical strengthened glass, asbestos, silica, stones such as marble; and wood. The shape or form of these adherents may be film, plate, sheet or powder. These adherents are positioned and arranged in such a way that all interlayers can be exposed to actinic light when the interlayers are photopolymerizable.

This invention will now be illustrated by the following examples in which parts are all by weight unless expressly stated contrary.

EXAMPLE 1

1.213 moles of 2.2-dimethyl-1,3-propanediol, 0.948 mole of adipic acid and 0.052 mole of fumaric acid were polycondensed under an atmosphere of nitrogen gas at a temperature of 200°C, for 9 hours under reduced pressure to produce an unsaturated esterdiol having an acid value of 2.6, a number average molecular weight of 1,400 and an ethylenic double bond concentration of $2.2 \times 10^{-4}$ mole per gram. 100 parts of the resulting esterdiol and 18.3 parts of 4,4'-diphenylmethane diisocyanate were allowed to react under an atmosphere of nitrogen at a temperature of 100°C, for 5 hours to produce an unsaturated polyurethane.

100 parts of the resulting unsaturated polyurethane, 45 parts of acrylic acid, 255 parts of n-butyl acrylate, 30 parts of styrene and 1 part of benzoin were thoroughly mixed to give a photopolymerizable composition. A spacer of 0.76 mm. in thickness was inserted between 2 transparent glass sheets of 3 mm. in thickness and the resulting photopolymerizable composition was poured therebetween. Both sides of the transparent glass sheets were exposed at room temperature for 10 minutes to a 2 KW. high pressure mercury lamp, each set at a distance of 70 cm. to give a laminated safety glass.

The laminated safety glass was subjected to Penetration Resistance Test according to American Standards Association Z26-1-1966. That is, the laminated safety glass was tested for penetration resistance by dropping a 2.27 Kg. steel sphere from various heights on the safety glass supported on a horizontal frame. The maximum height of penetration resistance means the maximum height from which the sphere is dropped and does not penetrate more than seven of ten specimens of the laminated safety glass. The maximum height of penetration resistance was 6.0 m.

EXAMPLE 2

A thermal polymerizable compositions was prepared in the same manner as in Example 1 except that 2 parts of dicumyl peroxide were used instead of the benzoin. The thermal polymerizable composition was charged between two transparent glass sheets in the same manner as in Example 1 and the resulting assembly was placed in a thermostat maintained at 80°C. for 5 hours. The resulting laminated safety glass was subjected to the same Penetration Resistance Test as in Example 1 and the maximum height of penetration resistance was 5.5 m.

EXAMPLE 3

Using the starting components set forth in Table 1 there were obtained unsaturated esterdiols in the same manner as in Example 1. Using each of the resulting esterdiols there was prepared an unsaturated polyurethane in the same manner as in Example 1 and then a photopolymerizable composition was obtained by substituting the unsaturated polyurethane of the Example 1 with the resulting unsaturated polyurethane. From the photopolymerizable composition there was prepared a laminated safety glass in the same manner as in Example 1 and the resulting laminated safety glass was subjected to the same penetration Resistance Test as in Example 1. The results are shown in Table 1.

The number average molecular weight and the ethylenic double bond concentration of the unsaturated esterdiols were adjusted to $1,400 \pm 25$ and $(2.2 \pm 0.05) \times 10^{-4}$ mole per gram, respectively, and the acid value of the esterdiols was adjusted to $3.0 \pm 1.0$.

EXAMPLE 4

Using 2,2-dimethyl-1,3-propanediol, adipic acid and fumaric acid in various mole ratios set forth in Table 2, there was prepared unsaturated esterdiols having a variety of molecular weights set forth in Table 2 in the same manner as in Example 1. Using each of the resulting esterdiols there was obtained an unsaturated polyurethane in the same manner as in Example 1 and then a photopolymerizable composition was obtained by substituting the unsaturated polyurethane of Example 1 with the resulting unsaturated polyurethane. From the photopolymerizable composition there was prepared a laminated safety glass in the same manner as in Example 1 and the resulting laminated safety glass was subjected to the same Penetration Resistance Test as in Example 1. The results are shown in Table 2.

The ethylenic double bond concentration of the unsaturated esterdiol was adjusted to $(2.2 \pm 0.05) \times 10^{-4}$ mole per gram and the reaction mole ratio of 4,4'-diphenylmethane diisocyanate to the unsaturated esterdiol was adjusted to 1.02 to 1.00, and the acid value of the unsaturated esterdiol was adjusted to $3.0 \pm 1.0$

EXAMPLE 5

Using 2,2-dimethyl-1,3-propanediol, adipic acid and fumaric acid in various mole ratios set forth in Table 3, there were prepared unsaturated esterdiols having a variety of ethylenic double bond concentrations set forth in Table 3 in the same manner as in Example 1. Using each of the resulting unsaturated esterdiols there was obtained an unsaturated polyurethane in the same manner as in Example 1 and then a photopolymerizable composition was obtained by substituting the unsaturated polyurethane of Example 1 with the resulting unsaturated polyurethane. From the photopolymerizable composition there was obtained a laminated safety glass in the same manner as in Example 1 and the resulting laminated safety glass was subjected to the same Penetration Resistance Test as in Example 1. The results are shown in Table 3.

The number average molecular weight and the acid value of the unsaturated esterdiols were adjusted to $1,400 \pm 25$ and $3.0 \pm 1.0$, respectively.

EXAMPLE 6

100 parts of the same unsaturated polyurethane as in Example 1, a desired amount of ethylenically unsaturated compounds set forth in Table 4 and 1.0 part of benzoin ethylether were thoroughly mixed to give photopolymerizable compositions. An assembly composed of, adherent, one sheet of glass having dimensions of 1 m. (length) × 1 m. (width) × 2 mm. (thickness), one sheet of polymethylmethacrylate having dimensions of 1 m. (length) × 1 m. (width) × 10 mm. (thickness) and one sheet of glass having dimensions of 1 m. (length) × 1 m. (width) × 2 mm. (thickness) and two interlayers of the resulting photopolymerizable composition, each of 0.4 mm. in thickness was exposed at room temperature for 10 minutes from the both sides of the assembly to a 2 KW high pressure mercury lamp at a distance of 70 cm. to give a laminated article. Then the temperature of one side of the laminated article thus obtained was constantly maintained at 0°C while that of the other side was reciprocally maintained at 0°C in a period of 2 hours. This test was continued for 100 hours. The laminated articles of Composition Nos. 1 to 6 did not break and no separation of the laminated articles did not developed. On the other hand, the laminated article of Reference 1 broke and separation of the laminated article developed after 27 hours and that of Reference 2 also broke and separation of the laminated article developed after 45 hours.

EXAMPLE 7

100 parts of the unsaturated polyurethane, 140 parts of acrylic acid, 140 parts of n-butyl acrylate, 20 parts of styrene, a desired amount of a compound as plasticizer set forth in Table 5 and 1 part of benzoin were thoroughly mixed to give a photopolymerizable composition.

Using each of the resulting photopolymerizable composition there were produced sheets of laminated safety glass.

These sheets of laminated safety glass was subjected to Penetration Resistance Test and Measurement of Percent Luminous Transmittance according to American Standards Association Z26-1-1966. The results are shown in Table 5.

EXAMPLE 8

100 parts of the unsaturated esterdiol of Composition No. 4 in Example 3 and 18.3 parts of xylylene diisocyanate (Trade mark "TAKENATE 500," a mixture of m-xylylene diisocyanate and p-xylylene diisocyanate at a weight ratio of 70–75 to 30–25) were allowed to react in the same manner as in Example 1 to produce an unsaturated polyurethane.

100 parts of the resulting unsaturated polyurethane, 70 parts of acrylic acid, 70 parts of 2-ethylhexyl acrylate, 15 parts of chlorostyrene and 1 part of benzoin ethylether were thoroughly mixed to give a photopolymerizable composition.

Using the resulting photopolymerizable composition as interlayer and a variety of adherents, there were produced the laminated articles set forth in Table 6 in the same manner as in Example 1. These laminated articles could be satisfactorily used as building materials such as windshields.

EXAMPLE 9

100 parts of the unsaturated esterdiol of Composition No. 5 in Example and 18.3 parts of hexamethylene diisocyanate were allowed to react in the same manner as in Example 1 to produce an unsaturated polyurethane.

100 parts of the resulting unsaturated polyurethane, 30 parts of methacrylic acid, 120 parts of 2-hydroxypropyl methacrylate, 8 parts of monoallylphthalate, 2 parts of methylethylketone and 0.5 part of cobalt naphthenete were thoroughly mixed to give a thermal polymerizable composition.

Using the resulting thermal polymerizable composition as interlayer and a variety of adherents, there were produced the laminated articles set forth in Table 7 at 25°C. for one hour in the same way as in Example 2. The temperature of one side of the laminated article thus produced was constantly maintained at 0°C. while that of the other wide was maintained reciprocally at 0°C. and at 60°C. in a period of 2 hours. This test was continued for 100 hours. All the laminated articles did not break and no separation of the laminated articles developed.

EXAMPLE 10

In the same manner as in Example 1, 1,210 moles of 2-ethyl-3-n-propyl-1,3-propanediol, 0.944 mole of sebacic acid and 0.056 mole of maleic acid were polycondensed to produce an unsaturated esterdiol having an acid value of 0.2, a number average molecular weight of 2,030 and an ethylenic double bond concentration of $1.7 \times 10^{-6}$ moles per gram. 100 parts of the resulting unsaturated esterdiol and 13.5 parts of 4,4'- dicyclohexylmethane diisocyanate were allowed to react in the same manner as in Example 1 to give an unsaturated polyurethane.

100 parts of the resulting unsaturated polyurethane, 70 parts of acrylic acid, 80 parts of n-butyl acrylate, 15 parts of styrene, 2 parts of tetramethylolmethane tetraacrylate, 50 parts of trioxyethyleneglycol dicaproate and 1 part of benzoin isopropylether were thoroughly mixed to give a photopolymerizable composition.

Using the resulting photopolymerizable composition there was produced a laminated article in the same manner as in Example 1 except that a cellophane bearing a colorful pattern for stained glass was buried in the interlayer. This laminated article could be used as a screen display.

EXAMPLE 11

To the photopolymerizable composition of Example 1 there were added a variety of polyfunctional unsaturated compounds set forth in Table 8 to give photopolymerizable compositions. Using each of the resulting photopolymerizable compositions there was produced a laminated safety glass in the same manner as in Example 1. The resulting laminated safety glass was subjected to the same Penetration Resistance Test as in Example 1. The results are shown in Table 8.

It will be appreciated that the instant specification and examples are set forth by way of illustration and not limitation, and that various modifications and changes may be made without departing from the spirit and scope of the present invention.

Table 1

| Composition No. | Kind of esterdiols Components (mole ratio) | Number average molecular weight of diol | Compatibility of the unsaturated polyurethane with the ethylenically unsaturated monomers | Penetration resistance* (maximum height:meters) |
|---|---|---|---|---|
| 1 | MPD/AA/FA (1.196/0.952/0.048) | 90 | Compatible | 6.0 |
| 2 | DMPD/AA/FA (1.213/0.948/0.052) | 104 | Compatible | 6.0 |
| 3 | TMED/AA/FA (1.231/0.944/0.056) | 118 | Compatible | 6.0 |
| 4 | EBD/AA/FA (1.231/0.944/0.056) | 118 | Compatible | 6.5 |
| 5 | EHD/AA/FA (1.264/0.936/0.064) | 144 | Compatible | 6.0 |
| 6 | DMCH/AA/FA (1.264/0.936/0.064) | 144 | Compatible | 5.5 |
| 7 | DCHD/AA/FA (1.339/0.917/0.083) | 198 | Compatible | 5.5 |
| 8 | BHPT/AA/FA (1.475/0.884/0.116) | 282 | Compatible | 5.5 |
| 9 | BHNP/AA/FA (1.570/0.858.0.143) | 338 | Compatible | 5.5 |
| Reference | | | | |
| 1 | EG/AA/FA (1.165/0.960/0.040) | 62 | Non-compatible | — |
| 2 | DEG/AA/FA (1.216/0.947/0.053) | 106 | Compatible | 3.0 |
| 3 | PPG/AA/FA (1.950/0.755/0.245) | 500 | Compatible | 4.0 |

Note:
MPD : 1-Methyl propanediol;
TMED: 1,1,2,2-tetramethyl ethanediol;
EHD : 2-ethyl-1,6-hexanediol;
DCHD: 4,4'-Dicyclohexyldiol;
BHNP: Bis (3-hydroxyneopentyl) phthalate;
DEG : Diethyleneglycol;
AA : Adipic acid;
DMPD: 2,2-Dimethyl-1,3-propanediol;
EBD : 2-Ethyl butanediol;
DMCH: 1,3-Dimethylol cyclohexane;
BHPT: Bis (2-hydroxypropyl) terephthalate;
EG : Ethyleneglycol;
PPG : Polyoxypropylene glycol having a number average molecular weight of 500;
FA : Fumaric acid

* Test was carried out at 20°C.

Table 2

| Composition No. | Kind of esterdiols Components (mole ratio) DMPD/AA/FA | Number average molecular weight | Penetration resistance* (maximum height:meters) |
|---|---|---|---|
| 1 | 1.3550/0.946/0.054 | 760 | 5.0 |
| 2 | 1.213/0.948/0.052 | 1400 | 6.0 |
| 3 | 1.130/0.95/0.049 | 2300 | 4.5 |
| Reference | | | |
| 1 | 1.717/0.936/0.064 | 430 | 2.5 |
| 2 | 1.083/0.951/0.049 | 3200 | 4.0 |

Note: DMPD : 2,2-Dimethyl-1,3-propanediol
AA : Adipic acid
FA : Fumaric acid

* Test was carried out at 20°C.

Table 3

| Composition No. | Kind of esterdiols Components (mole ratio) DMPD/AA/FA | Ethylenic double bond concentration (mole/gram) | Penetration resistance* (maximum height:meters) |
|---|---|---|---|
| 1 | 1.214/0.962/0.038 | $1.7 \times 10^{-4}$ | 5.5 |
| 2 | 1.213/0.948/0.052 | $2.2 \times 10^{-4}$ | 6.0 |
| Reference | | | |
| 1 | 1.213/0.977/0.023 | $1.0 \times 10^{-4}$ | 3.66 |
| 2 | 1.212/0.907/0.093 | $4.0 \times 10^{-4}$ | 3.0 |

Note: DMPD : 2,2-Dimethyl-1,3-propanediol
AA : Adipic acid
FA : Fumaric acid

* Test was carried out at 20°C.

Table 4

| Composition No. | Ethylenically unsaturated monomers and compounds Components | Amount (parts by weight) |
|---|---|---|
| 1 | Acrylic acid/Methyl acrylate | 30/270 |
| 2 | Acrylic acid/2-Ethylhexyl acrylate/Styrene | 60/210/30 |
| 3 | Acrylic acid/3-Chloro-2-hydroxypropyl methacrylate/Butyl acrylate/Styrene | 50/100/100/40 |
| 4 | Acrylic acid/N-3-oxo-1,1-dimethyl butyl acrylamide/Ethyl acrylate/Styrene | 30/90/150/30 |
| 5 | Acrylic acid/Acrylamide/n-Butyl acrylate/Styrene | 40/20/210/30 |
| 6 | Methacrylic acid/Methyl acrylate/Triethyleneglycol diacrylate | 20/230/3 |
| Reference 1 | Acrylic acid/Triethyleneglycol | 50/200 |
| 2 | Methyl methacrylate/Methyl acrylate | 50/200 |

Table 5

| Composition No. | Kind & amount of plasticizers (parts by weight) | | Percent luminous transmittance (%) | Penetration resistance (maximum height: meters) | | | |
|---|---|---|---|---|---|---|---|
| | | | | −20°C. | 0°C. | 20°C. | 40°C. |
| 1 | Diethyleneglycol | (40) | 88 | 2.5 | 5.5 | 6.5 | 3.7 |
| 2 | Tetraethyleneglycol | (50) | 87 | 2.5 | 5.0 | 6.5 | 4.0 |
| 3 | Polyethyleneglycol having a number average molecular weight of 400 | (55) | 83 | 2.0 | 4.5 | 6.5 | 3.7 |
| 4 | Triethyleneglycol diacetate | (80) | 87 | 3.0 | 5.0 | 6.5 | 4.0 |
| 5 | Triethyleneglycol divalerate | (90) | 88 | 4.0 | 7.0 | 7.5 | 4.5 |
| 6 | Triethyleneglycol dicaproate | (90) | 88 | 3.7 | 6.5 | 7.5 | 5.0 |
| 7 | Triethyleneglycol dibenzoate | (90) | 88 | 2.5 | 5.5 | 7.0 | 4.5 |
| 8 | Diethyleneglycol monoethyl ether | (55) | 87 | 2.5 | 5.0 | 7.0 | 4.0 |
| 9 | Diethyleneglycol monobutyl ether | (60) | 86 | 2.5 | 5.0 | 6.5 | 4.0 |
| Reference 1 | Polyethyleneglycol having a number average molecular weight of 600 | (70) | 74 | 1.0 | 3.7 | 6.0 | 3.0 |
| 2 | Diethyleneglycol monohexyl ether | (65) | 78 | 1.0 | 4.0 | 6.0 | 3.0 |
| 3 | Triethyleneglycol dioctate | (90) | 73 | 1.0 | 4.0 | 6.0 | 3.0 |
| 4 | Triethyleneglycol-di-2-ethyl butyrate | (90) | 75 | 1.0 | 4.0 | 7.0 | 3.5 |
| 5 | Diethyleneglycol-monoisobutyl ether | (60) | 77 | 1.0 | 3.7 | 6.5 | 3.5 |

Table 6

| Adherent *1 (mm. in thickness) | *2 | Adherent *1 (mm. in thickness) |
|---|---|---|
| Glass (2) | | Polycarbonate (2) |
| do. | | Polymethylmethacrylate (2) |
| do. | | Polycarbonate (0.05) |
| do. | | Polyethyleneterephthalate (0.05) |
| do. | | Biaxtially oriented polypropylene (0.1) |
| do. | | Cellulose triacetate (0.1) |

*1 Adherent of 1 m. (length) × 1 m. (width)
*2 Interlayer of 0.4 mm. in thickness Table 7

| Adherent *1 (mm. in thickness) | *2 | Adherent *1 (mm. in thickness) | *2 | Adherent *1 (mm. in thickness) |
|---|---|---|---|---|
| Glass (3) | | Polymethylmethacrylate (3) | — | — |
| do. | | Polyvinylchloride (2) | — | — |
| do. | | Polycarbonate (2) | — | — |
| Glass (2) | | Polymethylmethacrylate (3) | | Glass (2) |
| do. | | Polycarbonate (2) | | do. |
| do. | | Aluminum (0.3) | — | — |
| do. | | Marble (10) | — | — |

*1 Adherent of 1 m. (length) × 1 m. (width)
*2 Interlayer of 0.4 mm. in thickness Table 8

| Composition No. | Kind | Ethylenic double bond concentration (mole/gram) | Amount (weight percent) | Penetration resistance (maximum height : meters) | |
|---|---|---|---|---|---|
| | | | | 20°C. | 40°C. |
| 1 | Ethyleneglycol dimethacrylate | $10.1 \times 10^{-3}$ | 3.0 | 6.0 | 4.8 |
| 2 | Triethyleneglycol dimethacrylate | $7.4 \times 10^{-3}$ | 3.0 | 6.0 | 4.5 |
| 3 | Tetraallyloxyethane | $15.6 \times 10^{-3}$ | 1.0 | 6.0 | 4.5 |
| 4 | Trimethylolpropane triacrylate | $10.1 \times 10^{-3}$ | 3.0 | 6.0 | 4.8 |
| 5 | Diallylphthalate | $8.1 \times 10^{-3}$ | 4.0 | 6.3 | 4.5 |
| 6 | Neopentyl diacrylate | $9.4 \times 10^{-3}$ | 0.12 | 6.0 | 4.3 |
| 7 | do. | do. | 2.0 | 6.0 | 4.5 |
| 8 | do. | do. | 7.0 | 5.5 | 4.5 |
| 9 | Ethyleneglycol diacrylate | $11.8 \times 10^{-3}$ | 1.5 | 6.0 | 4.5 |

Table 8—Continued

| Composition No. | Kind | Ethylenic double bond concentration (mole/gram) | Amount (weight percent) | Penetration resistance (maximum height : meters) | |
|---|---|---|---|---|---|
| | | | | 20°C. | 40°C. |
| Reference | | | | | |
| 1 | do. | do. | 0.08 | 6.0 | 3.7 |
| 2 | do. | do. | 9.0 | 4.0 | 4.5 |
| 3 | — | — | — | 6.0 | 3.7 |
| 4 | Tetraethyleneglycol dimethacrylate | $6.0 \times 10^{-3}$ | 3.0 | 5.3 | 3.7 |

What is claimed is:

1. A polymerizable composition comprising:

I. about 100 parts by weight of an unsaturated polyurethane produced from a diisocyanate and an unsaturated esterdiol having an acid value of up to about 10, a number average molecular weight of from about 500 to 2,500 and containing about $1.2 \times 10^{-4}$ to $3.8 \times 10^{-4}$ mole of ethylenic double bond concentration per gram of said unsaturated esterdiol, said unsaturated esterdiol having been prepared by reaction between an alcoholic component comprising at least about 40% by weight of a stereo-hindered diol having a molecular weight of from about 90 to 400 and an acidic component comprising at least one unsaturated dicarboxylic acid, its anhydride or its methyl or ethyl ester and at least one saturated dicarboxylic acid, its anhydride or its methyl or ethyl ester, said sterically hindered diol being a member selected from the group consisting of 1,1-dimethyl-1,2-ethanediol, 1,2-dimethyl-1,2-ethanediol, 1,1,2,2-tetramethyl-1,2-ethanediol, 1-ethyl-1,2-ethanediol, 1-ethyl-2-methyl-1,2-ethanediol, 1-methyl-1,3-propanediol, 1-ethyl-1,3-propanediol, 2,2-dimethyl-1,3-propanediol, 2-methyl-2-ethyl-1,3-propanediol, 1,1,3-trimethyl-1,3-propanediol, 2,2-dimethyl-3-isopropyl-1,3-propanediol, 2-ethyl-3-propyl-1,3-propanediol, 1-methyl-1,4-butanediol, 2-ethyl-1,4-butanediol, 2,2-dimethyl-1,4-butanediol, 2-methyl-1,5-pentanediol, 2-methyl-2-propyl-1,5-pentanediol, 2-ethyl-1,6-hexanediol, 2,2,4-trimethyl-1,6-hexanediol, 1,2-cyclobutanediol, 1,3-cyclobutanediol, 1,3-cyclohexanediol, 1,4-cyclohexanediol, 1,3-dimethylol cyclohexane, 1,4-dimethylol cyclohexane, 4,4'-dicyclohexydiol, 4,4'-dicyclohexydiol, 4,4'-isopropylidene dicyclohexydiol, bis (beta-hydroxypropyl) terephthalate, bis (beta-hydroxypropyl) isophthalate, bis (beta-hydroxypropyl) phthalate, bis (beta-hydroxyneopentyl) terephthalate, bis (beta-hydroxyneopentyl) isophthalate, bis (beta-hydroxy-neopentyl) phthalate, bis (beta-hydroxyethyl) isophthalate and bis (betahydroxyethyl) phthalate, II. about 100 to 350 parts by weight of at least two ethylenically unsaturated monomers A. one of said monomers comprising a compound selected from the group consisting of:

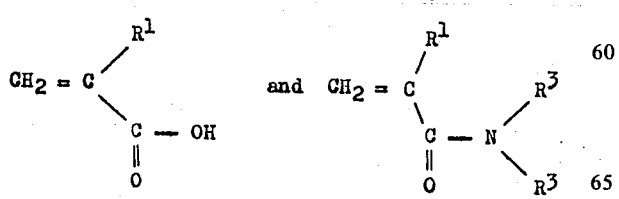

wherein
$R^1$ and $R^2$ represent a hydrogen atom or methyl group respectively, and $R^3$ represents a hydrogen atom, alkyl group having 1 to 3 carbon atoms, hydroxymethyl or benzyl group, B. the other of said monomers being present to the extent of from about 70 to 95% by weight of the monomers and comprising at least one compound selected from the group consisting of:

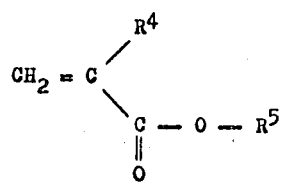

and 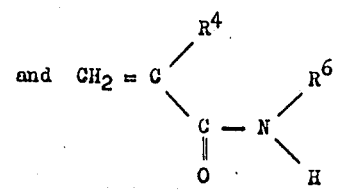

wherein
$R^4$ represents a hydrogen atom or methyl group; $R^5$ represents an alkyl group having 1 to 8 carbon atoms, 3-chloro-2-hydroxypropyl, glycidyl, tetrahydrofurfuryl or oxyalkylene group of

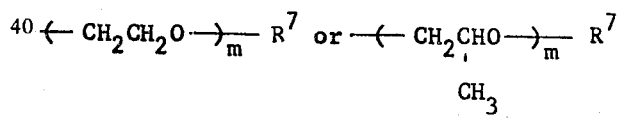

having a number average molecular weight of from about 45 to about 1,000, wherein $R^7$ represents a hydrogen atom or methyl group; and $R^6$ represents a butoxymethyl group or 3-oxohydrocarbon group having 4 to 8 carbon atoms; and III. about 0.01 to 10 parts by weight of a polymerization initiator.

2. A polymerizable composition as claimed in claim 1, wherein said polymerization initiator is a photopolymerization initiator.

3. A polymerizable composition as claimed in claim 1, wherein said polymerization initiator is a thermal polymerization initiator.

4. A polymerizable composition as claimed in claim 1, wherein said stereo-hindered diol is a branched alkyldiol.

5. A polymerizable composition as claimed in claim 4, wherein said branched alkyldiol is 2,2-dimethyl-1,3-propanediol.

6. A polymerizable composition as claimed in claim 4, wherein said branched alkyldiol is 2-ethyl butanediol.

7. A polymerizable composition as claimed in claim 1, wherein said ethylenically unsaturated monomer (A) is acrylic acid.

8. A polymerizable composition as claimed in claim 1, wherein said ethylenically unsaturated monomer (B) is n-butylacrylate.

9. A polymerizable composition as claimed in claim 1, wherein said ethylenically unsaturated monomer (B) is 2-ethylhexyl acrylate.

10. A polymerizable composition as claimed in claim 1, wherein said unsaturated acid is fumaric acid.

11. A polymerizable composition as claimed in claim 1, wherein said unsaturated acid is maleic acid.

12. A polymerizable composition as claimed in claim 1, wherein said saturated acid is adipic acid.

13. A polymerizable composition as claimed in claim 1, wherein said saturated acid is sebacic acid.

14. A polymerizable composition as claimed in claim 1 which additionally contains up to about 40% by weight, based on the total weight of said two ethylenically unsaturated monomers (A) and (B), of (C) at least one aromatic compound having at least one

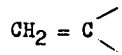

group and one benzene nucleus.

15. A polymerizable composition as claimed in claim 14, wherein said aromatic compound is styrene.

16. A polymerizable composition as claimed in claim 14, wherein said aromatic compound is chlorostyrene.

17. A polymerizable composition as claimed in claim 1 which additionally contains about 0.1 to 7.0 % by weight, based on the total weight of the polymerizable composition, of at least one polyfunctional unsaturated compound having an ethylenic double bond concentration of about $6.6 \times 10^{-3}$ to $3.3 \times 10^{-2}$ mole per gram.

18. A polymerizable composition as claimed in claim 17, wherein said polyfunctional unsaturated compound is ethyleneglycol diacrylate.

19. A polymerizable composition as claimed in claim 17, wherein said polyfunctional unsaturated compound is neopentyl diacrylate.

20. A polymerizable composition as claimed in claim 17, wherein said polyfunctional unsaturated compound is trimethylolpropane triacrylate.

21. A polymerizable composition as claimed in claim 17 which additionally contains up to about 40 % by weight, based on the total weight of said two ethylenically unsaturated monomers (A) and (B), of (C) at least one

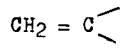

group and one benzene nucleus.

22. A polymerizable composition comprising:
I. about 100 parts by weight of an unsaturated polyurethane produced from a diisocyanate and an unsaturated esterdiol having an acid value of up to about 10, a number average molecular weight of from about 500 to 2,500 and containing about 1.2 $\times 10^{-4}$ to $3.8 \times 10^{-4}$ mole of ethylenic double bond concentration per gram of said unsaturated esterdiol, said unsaturated esterdiol having been prepared by reaction between an alcoholic component comprising at least about 40% by weight of a stereo-hindered diol having a molecular weight of from about 90 to 400 and an acidic component comprising at least one unsaturated dicarboxylic acid, its anhydride or its methyl or ethyl ester and at least one saturated dicarboxylic acid, its anhydride or its methyl or ethyl ester, said sterically hindered diol being a member selected from the group consisting of 1,1-dimethyl-1,2-ethanediol, 1,2-dimethyl-1,2-ethanediol, 1,1,2,2-tetramethyl-1,2-ethanediol, 1-ethyl-1,2-ethanediol, 1-ethyl-2-methyl-1,2-ethanediol, 1-methyl-1,3-propanediol, 1-ethyl-1,3-propanediol, 2,2-dimethyl-1,3-propanediol, 2-methyl-2-ethyl-1,3-propanediol, 1,-1,3-trimethyl-1,3-propanediol, 2,2-dimethyl-3-isopropyl-1,3-propanediol, 2-ethyl-3-propyl-1,3-propanediol, 1-methyl-1,4-butanediol, 2-ethyl-1,4-butanediol, 2,2-dimethyl-1,4-butanediol, 2-methyl-1,5-pentanediol, 2-methyl-2-propyl-1,5-pentanediol, 2-ethyl-1,6-hexanediol, 2,2,4-trimethyl-1,6-hexanediol, 1,2-cyclobutanediol, 1,3-cyclobutanediol, 1,3-cyclohexanediol, 1,4-cyclohexanediol, 1,3-dimethylol cyclohexane, 1,4-dimethylol cyclohexane, 4,4'-dicyclohexydiol, 4,4'-dicyclohexydiol, 4,4' -isopropylidene dicyclohexydiol, bis (beta-hydroxypropyl) terephthalate, bis (beta-hydroxypropyl) isophthalate, bis (beta-hydroxypropyl) phthalate, bis (beta-hydroxyneopentyl) terephthalate, bis (beta-hydroxyneopentyl) isophthalate, bis (beta-hydroxy-neopentyl) phthalate, bis (beta-hydroxyethyl) isophthalate and bis (beta-hydroxyethyl) phthalate, II. about 100 to 350 parts by weight of at least two ethylenically unsaturated monomers
A. one of said monomers comprising a compound selected from the group consisting of:

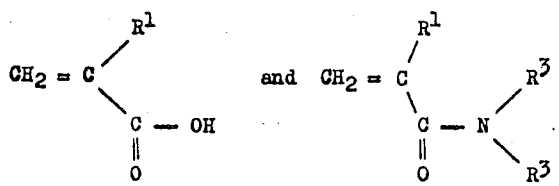

wherein $R^1$ and $R^2$ represent a hydrogen atom or methyl group respectively, and $R^3$ represents a hydrogen atom, alkyl group having 1 to 3 carbon atoms, hydroxymethyl or benzyl group, B. the other of said monomers being present to the extent of from about 30 to 80% by weight of the monomers and comprising at least one compound selected from the group consisting of:

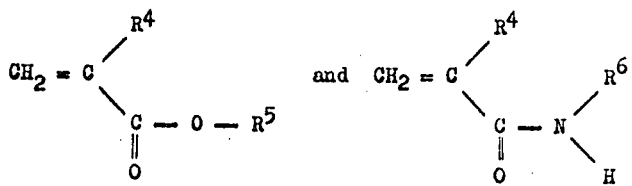

wherein $R^4$ represents a hydrogen atom or methyl group; $R^5$ represents an alkyl group having 1 to 8 carbon atoms, 3-chloro-2-hydroxypropyl, glycidyl, tetrahydrofurfuryl or oxyalkylene group of

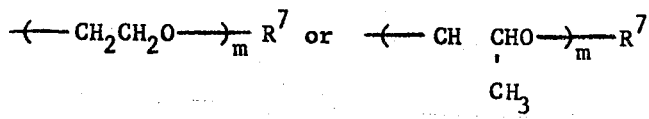

having a number average molecular weight of from about 45 to about 1,000, wherein $R^7$ represents a hydrogen atom or methyl group; and $R^6$ represents a butoxymethyl group or 3-oxohydrocarbon group having 4 to 8 carbon atoms;

III. about 0.01 to 10 parts by weight of a polymerization initiator, and

IV. about 5 to 50% by weight, based on the total weight of the polymerizable composition, of at least one compound selected from the group consisting of:

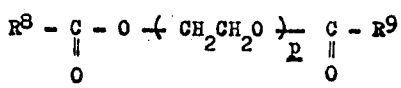

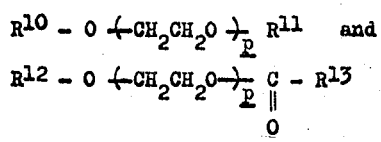

wherein $R^8$, $R^9$ and $R^{13}$ represent a n-alkyl group having 1 to 5 carbon atoms or phenyl group respectively; $R^{10}$, $R^{11}$ and $R^{12}$ represent a hydrogen atom, n-alkyl group having 1 to 5 carbon atoms or phenyl group respectively; and $p$ is an integer of 1 to 10.

23. A polymerizable composition as claimed in claim 22, wherein saids compound (IV) is triethyleneglycol divalerate.

24. A polymerizable composition as claimed in claim 22, wherein said compound (IV) is triethyleneglycol dicaproate.

25. A polymerizable composition as claimed in claim 22 which additionally contains up to about 40 % by weight, based on the total weight of said two ethylenically unsaturated monomers (A) and (B), of (C) at least one aromatic compound having at least one

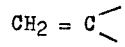

group and one benzene nucleus.

26. A polymerizable composition as claimed in claim 22 which further contains about 0.1 to 7.0 % by weight, based on the total weight of the polymerizable composition, of at least one polyfunctional unsaturated compound having an ethylenic double bond concentration of about $6.6 \times 10^{-3}$ to $3.3 \times 10^{-2}$ mole per gram.

27. A polymerizable composition as claimed in claim 25 which further contains about 0.1 to 7.0 % by weight, based on the total weight of the polymerizable composition, of at least one polyfunctional unsaturated compound having an ethylenic double bond concentration of about $6.6 \times 10^{-3}$ to $3.3 \times 10^{-2}$ mole per gram.

* * * * *